United States Patent [19]

Iida et al.

[11] 4,038,654

[45] July 26, 1977

[54] INDICATION DEVICE IN PLAN POSITION INDICATION SYSTEM

[75] Inventors: Masajiro Iida; Hideharu Morimatsu, both of Takarazuka; Itsuo Fukuoka; Yoshinari Yoshida, both of Nishinomiya, all of Japan

[73] Assignee: Furuno Electric Company, Japan

[21] Appl. No.: 612,906

[22] Filed: Sept. 12, 1975

[51] Int. Cl.² ........................... G01S 7/22; G01S 9/68
[52] U.S. Cl. ............................... 343/5 EM; 340/1 R; 340/3 C; 343/11 R
[58] Field of Search ................... 343/5 EM, 11 R; 340/6 R, 1 R, 3 C

[56]  References Cited
U.S. PATENT DOCUMENTS

| 2,422,697 | 6/1947 | Meacham | 343/5 EM |
| 3,602,877 | 8/1971 | Currie et al. | 340/6 R |
| 3,646,557 | 2/1972 | Scheer | 343/5 EM |

Primary Examiner—Maynard R. Wilbur
Assistant Examiner—Richard E. Berger
Attorney, Agent, or Firm—Eugene E. Geoffrey, Jr.

[57] ABSTRACT

A plan position indicating system which includes a display screen and means for indicating on the screen the tilt angle of the transmitted beam and received signals to enable measurement not only of direction and distance but also the horizontal and vertical components thereof.

3 Claims, 3 Drawing Figures

INDICATION DEVICE IN PLAN POSITION INDICATION SYSTEM

This invention relates to an improvement in a plan position indication (PPI) system, and more particularly to a device for indicating a tilt maker and a distance marker on the display screen of the PPI system. This invention is useful among other things, for application to a sonar system having a display screen scanned circularly.

In the sonar system, an ultrasonic wave pulse is emitted from the transmitter at a specific tilt angle with respect to the horizontal plane to the whole azimuth at the same time and the pulse reflected by an object is received by the receiver having a sharp directivity controlled at the same tilt angle and varying the azimuth at a specific frequency. The electron beam of a cathode ray tube is modulated with the received pulse, thereby indicating the position of the object on the display screen of the cathode ray tube. According to such prior system, the straight distance and the azimuth of the object can be observed and obtained directly on the screen, but its horizontal distance and vertical depth can not be obtained directly unless they are calculated from the straight distance and the tilt angle.

Accordingly, an object of this invention is to provide a novel device for indicating a tilt marker and a distance marker on the display screen of the PPI system, from which the horizontal and vertical components of the straight distance can be easily observed and obtained.

According to this invention, the device comprises display means having a display screen scanned with a number of concentric circular arcs, means for indicating a selected one of said scanning circular arcs as a bright circle, and means for indicating a radius on said display screen as a bright line, said radius having a tilt angle corresponding to that of the transmitter and the receiver.

Now, the invention will be described in more detail hereinunder in conjunction with a preferred embodiment of the invention with reference to the accompanying drawings.

Figure 1:
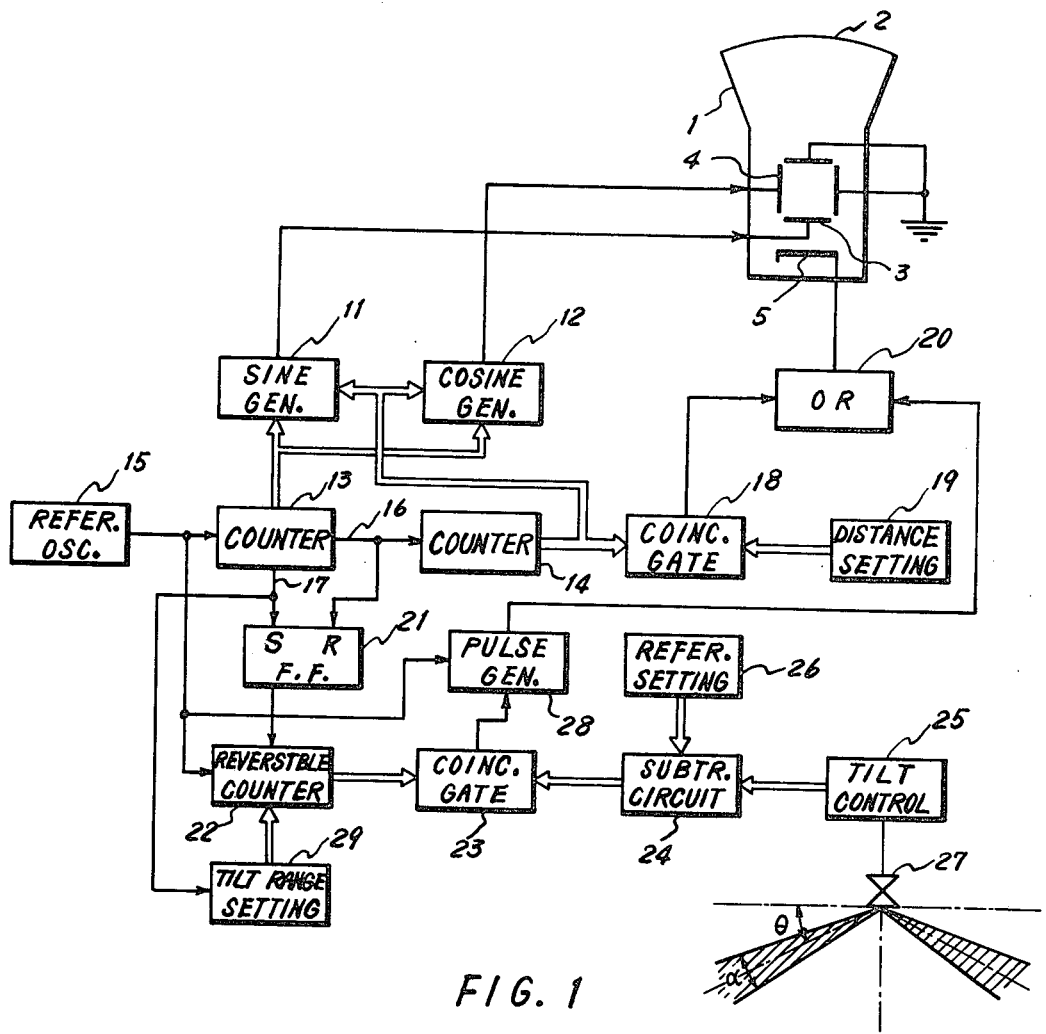
FIG. 1 is a schematic block diagram representing an embodiment of the device of this invention, applied to a sonar system.

Referring to FIG. 1, the device includes a cathode ray tube 1 having a circular display screen 2, vertical and horizontal deflection electrodes 3 and 4 and an electron beam modulating electrode 5. The vertical and horizontal deflection electrodes 3 and 4 are connected respectively to the outputs of a sine wave generator circuit 11 and a cosine wave generator circuit 12 having first inputs connected in common to the count output of a first counter circuit 13 and second inputs connected in common to the count output of a second counter circuit 14. The input of the first counter circuit 13 is connected to the output of a reference pulse oscillator 15 which produces a train of reference clock pulses.

The first counter circuit 13 is arranged to count the clock pulses from the pulse oscillator 15 and produce the count output in a coded form. More specifically, circuit 13 produces a pulse at a first pulse output 16 upon the completion of each predetermined reference count and a pulse at a second pulse output 17 for each half of said reference count. The reference count may be determined arbitrarily but is preferably selected as 360 as described later. The second counter circuit 14 counts the pulses from the first pulse output 16 of the first counter circuit 13 and produces the count output in a coded form. The sine and cosine wave generator circuits 11 and 12 are arranged to produce sine and cosine wave signals having a common period corresponding to the above reference count of the first counter circuit 13 and a common amplitude proportional to the count of the second counter circuit 14. It will be understood from the above arrangement by those skilled in the art that a circular scan, having a cycle corresponding to the above-mentioned reference count and wherein the diameter increases step by step by upon the completion of each cycle, is carried out on the display screen 2 of the cathode ray tube 1. It should be noted that this scan cycle is precisely synchronized with the azimuth rotation of the sonar receiver, as well as with the ultrasonic wave pulses emitted from the transmitter, by means not shown, since a further description has not been deemed necessary as it has not direct connection to the invention and, moreover, it is well known in this field.

The count output of the second counter circuit 14 is also connected to a first input of a coincidence gate 18 having a second input which is supplied from a distance setting unit 19 in a coded form. The coincidence output of the coincidence gate 18 is connected to one input of an OR gate 20 having an output connected to the beam modulating electrode 5 of the cathode-ray tube 1.

The second pulse output 17 of the first counter circuit 13 is connected to the "set" input S of a flip-flop circuit 21 and the first pulse output 16 is also connected to the "reset" input R thereof. The output of the flip-flop circuit 21 is connected to a reversible counter circuit 22 as its control input. The output of the reference pulse oscillator 15 is also connected to the input of the reversible counter circuit 22 and the counter 22 counts the clock pulses from the oscillator 15 under control of the output of the flip-flop circuit 21 and produces a count output in a coded form.

The flip-flop circuit 21 is arranged to be set in the "high" state by the pulse from the second pulse output 17 of the first counter circuit 13 and produce a high level output, and to be reset to the "low" state by the pulse from the first pulse output 16 of the same counter 13 and produce a low level output, and the reversible counter circuit 22 is arranged to execute an addition operation in response to the low level output of the flip-flop circuit 21 and a subtraction operation in response to the high level output thereof. It will be understood from the above arrangement that the reversible counter circuit 22 executes the addition operation during the first half of the scan cycle of the display screen 2 and the subtraction operation during the remaining half thereof.

The count output of the reversible counter circuit 22 is connected to one input of a second coincidence gate 23, another input of which is supplied from a subtraction circuit 24. The subtraction circuit 24 has two inputs, one connected to a tilt control unit 25 and another connected to a reference angle setting unit 26. The tilt control unit 25 is arranged to control the tilt angle $\theta$ of the directivity of the transducer 27 of the transmitter and receiver at a predetermined valve and produce tilt angle information in a coded form. The reference angle setting unit 26 is arranged to produce a coded output corresponding to a predetermined reference angle which is preset therein. The subtraction circuit 24 is arranged to subtract the tilt angle supplied by the tilt control unit 25 from the reference angle supplied by the reference angle setting unit 26 and produce a difference output in a coded form. The coincidence output of the coincidence gate 23 is connected to a pulse generator circuit 28 as a control input.

The directivity of the transducer 27 has for practical purposes some width or deviation as shown by angle $\alpha$, and the pulse generator circuit 28 and a tilt range setting unit 29 are provided for indicating this width on the screen 2. In addition to the input from the coincidence gate 23, the pulse generator circuit 28 is supplied, as a reference input, with the clock pulses from the reference pulse oscillator 15. The pulse generator circuit 28 is arranged to produce a pulse having a duration corresponding to the above angle $\alpha$ based upon the reference clock pulses and forward it to another input of the OR gate 20 under control of the output of the coincidence gate 23. The tilt range setting unit 29 has a control input supplied from the second pulse output 17 of the first counter circuit 13 and is arranged to produce a coded output corresponding to the preset angle $\alpha$ and forward it to the reversible counter 22 under control of the pulse from the counter 13. The reversible counter 22 is also arranged to subtract this output from its content when it is supplied.

Now, the operation of the device of FIG. 1 will be described with reference to FIGS. 2 and 3. As an aid in understanding, the above-mentioned reference count is assumed as 360, whereby one degree of scan angle corresponds to one count of the reference clock pulses. The tilt angle $\theta$ and the tilt range $\alpha$ are also assumed as 30° and 10°. These values are previously set in the first counter circuit 13, reference angle setting unit 26, pulse generator circuit 28 and tilt range setting unit 29, as described above.

The train of clock pulses sent out from the reference pulse oscillator is counted by the first counter circuit 13 and the counter circuit 13 produces an output pulse every 360 counts from its first pulse output 16. As the sine and cosine wave generators 11 and 12 are arranged to produce sine and cosine wave signals having periods corresponding to the 360 count of the first counter circuit 13, the cycle of scan of the cathode ray tube 1 is repeated every 360 counts and 1° of scan angle corresponds to the period of the reference clock pulses. As the second counter circuit 14 counts the pulses from the first counter circuit 13 and the sine and cosine wave generators 11 and 12 are also arranged to make the amplitude of the sine and cosine waves proportional to the count of the second counter 14, the diameter of the scanning circle increases step by step at the end of every scan cycle and, consequently, the display screen 2 of the cathode ray tube 1 is scanned by a number of concentric circular arcs as shown in FIG. 2.

The first coincidence gate 18 compares the count output of the second counter circuit 14 with the output of the distance setting unit 18 and forwards the output through the OR gate 20 to the beam modulating electrode 5 of the cathode ray tube 1 when coincidence is obtained therebetween. This results in luminescence of a specific scanning circle which corresponds to the count output of the counter 14 at that time and which in turn corresponds to the distance previously set in the distance setting unit 19. As shown in FIG. 3, this bright circle 31 can be put on a specific object 32 displayed on the screen 2 by adjusting the preset value of the distance setting unit 19. The straight or true distance of the object 32 can be obtained from the intersection of this circle 31 and the orthogonal reference X or Y having a calibrated distance graduation.

As described previously, the reversible counter circuit 22 executes addition and substraction operations alternatingly every half cycle of scan, that is, every 180 counts of the reference clock pulses. As the counter circuit 22 also counts the same clock pulses from the clock pulse oscillator 15, the count output of the counter 22 increases from 0 to 180 and then decreases from 180 to 0 during one cycle of scan. It will be understood that the count of the counter circuit 22 corresponds to the circumferential angle measured upwardly from the radius OY' which corresponds to the zero count of the counter 22.

However, the tilt angle $\theta$ of this embodiment is measured downwardly from the horizontal plane and is preferably indicated on the screen 2 with reference to the horizontal axis X. The substraction circuit 24 is provided for this purpose to produce a complementary angle of the tilt angle $\theta$. In order to obtain a desired result, the angle to be set in the reference angle setting unit 26 is selected as $90° - \alpha/2$, where the angle $\alpha$ is the abovementioned tilt width or tilt range. In this example, $90° - 10°/2 = 85°$ is previously set in the unit 26 which in turn produces a corresponding coded output. As the tilt control unit 25 produces an output corresponding to the preselected tilt angle, 30°, in this example, the subtraction circuit 24 executes an operation of $85° - 30° = 55°$. As the angle of 55° corresponds to the count of 55 pulses in the reversible counter circuit 22, the coincidence gate 23 produces its coincidence output at a radius 33, which makes an angle of 55° with respect to the reference line OY' as shown in FIG. 3, on every scan line, during the first half of the scan cycle.

At the beginning of the remaining half of the scan cycle, however, the first counter circuit 13 forwards a pulse from its second pulse output 17 to the tilt range setting unit 29 and the unit 29 feeds its output, the preset angle $\alpha = 10°$, to the reversible counter circuit 22 in response to this pulse. The counter circuit 22 subtracts this angle from its content, 180, and initiates its reverse counting action from 170. Accordingly, the count of 55 is reached earlier by 10 pulses at a radius 34' which makes an angle of 65° with respect to the reference line OY', as shown in FIG. 3. Thus, the coincidence gate 23 produces its coincidence output at the radius 34" on every scan line during the remaining half of the scan cycle.

The pulse generator circuit 28, which is arranged to produce a pulse having a duration corresponding to the tilt range, $\alpha = 10°$, in response to the output from the coincidence gate 23, supplies its output continuously through the OR gate 20 to the beam modulating electrode 5 of the cathode ray tube 1 during the time intervals from the radius 33 to 34 and from the radius 34' to 33' of every scan cycle. This results in luminous indication of two symmetric sectorial domains between these radii as shown by the shadowed areas in the drawing.

As readily understood from the above description, two symmetric radii 35 and 35' which represent the tilt angle $\theta$, can be luminously indicated on the screen 2 by setting zero as the tilt range $\alpha$ in the units 26, 28, and 29, and that the requested horizontal distance and vertical depth of the object can be obtained visibly as the X and Y co-ordinates $s$ and $d$, respectively, of the intersection of the luminous circle 31 and the radius 35 as shown by the drawing. In the case of indicating the tilt range $\alpha$, the errors of the values $s$ and $d$ are also obtainable from the circle 31 and the radii 33 and 34.

It is also understood that, when the device has no need for the tilt range indication, it can be simplified by omitting the units 28 and 29 and connecting the output of the coincidence gate 23 directly to the OR gate 20 and, moreover, when the tilt control unit 25 is arranged to produce the complement of the tilt angle, the units 24 and 26 are also omittable.

Figure 2:
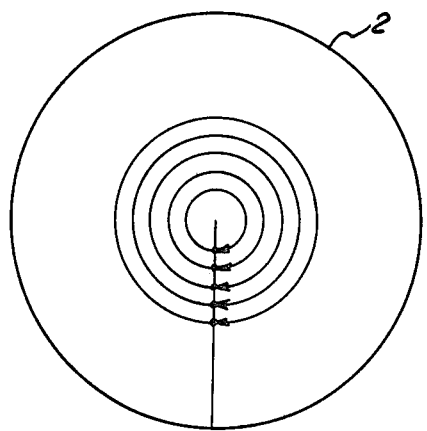
FIG. 2 is a diagram illustrative of the scanning mode of the display screen of the device.
Figure 3:
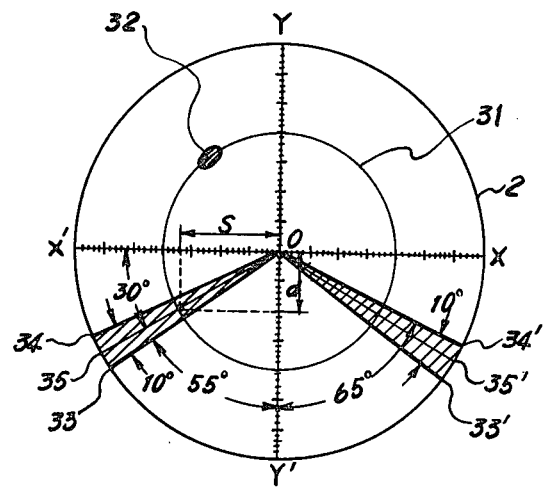
FIG. 3 is a diagram illustrative of a display pattern on the screen given by the device of FIG. 1.

Although the above description was made in conjunction with an embodiment in sonar system, it should be noted that this invention is applicable also to various systems other than the sonar system provided that these systems utilize circular scanning as shown in FIG. 2.

What is claimed is:

1. An indication device in a plan position indication system including means for transmitting and receiving a spatial wave signal with directivity to and from a specific direction having a preselected tilt angle with respect to a horizontal plane; said device comprising a cathode ray tube including a circular display screen having a fixed reference diameter, scanning means for scanning said screen with a number of concentric circular scan lines, first indicating means for indicating a specific scan line as a bright circle to indicate the straight line distance to the object, second indicating means for indicating a specific radius of said display screen as a bright line, said radius having an angle corresponding to said tilt angle with respect to said reference diameter.

2. An indication device in a plan position indication system including means for transmitting and receiving a spatial wave signal with directivity to and from a specific direction having a preselected tilt angle with respect to a horizontal plane; said device comprising a cathode ray tube including a circular display screen having a fixed reference diameter, scanning means for scanning said screen with a number of concentric circular scan lines, first indicating means for indicating a specific scan line as bright circle, second indicating means for indicating a specific radius of said display screen as a bright line, said radius having an angle corresponding to said tilt angle with respect to said reference diameter, said cathode ray tube further including horizontal and vertical deflecting electrodes and a beam modulating electrode; said scanning means includes a reference pulse oscillator for generating a train of reference clock pulses, a first counter for counting said clock pulses and producing a pulse every time said counter reaches a predetermined reference count, a second counter for counting said pulse output from said first counter and producing a count output, a sine wave generator and a cosine wave generator controlled by said first and second counters for generating sine and cosine wave signals having periods corresponding to said reference count and amplitudes proportional to the output count of said second counter, and means for coupling said sine and cosine wave signals to said vertical and horizontal deflecting electrodes respectively, said first indicating means including means for producing a specific count which corresponds to a preselected distance, means for comparing said specific count with the count output from said second counter and producing a pulse when coincidence is obtained therebetween, and means of coupling said pulse output from said comparing means to said beam modulating electrode, and said second indicating means including a reversible counter controlled by said first counter for counting said reference clock pulses from zero to a half of said reference count and then back to zero, means for controlling said tilt angle of said system and producing a specific count corresponding to the complementary angle of said tilt angle, means for comparing said specific count with the count output from said reversible counter and producing a pulse when coincidence is obtained therebetween, and means for coupling said pulse output from said comparing means to said beam modulating electrode.

3. An indication device according to claim 2 wherein said reversible counter in said second indicating means includes means for subtracting a predetermined count from its content when its counting operation from zero to a half of said reference count is completed, said specific count producing means including means for subtracting a half of said predetermined count from said specific count, and said pulse producing means includes means for controlling the duration of said pulse corresponding to said predetermined count on the basis of said reference clock pulses.

* * * * *